(12) United States Patent
Proidl

(10) Patent No.: US 6,580,871 B1
(45) Date of Patent: Jun. 17, 2003

(54) DEVICE AND METHOD FOR RECORDING AN INFORMATION SIGNAL IN A RECORD CARRIER IN WHICH A TEMPORARY STORE IS FORMED ON THE RECORD CARRIER, THE TEMPORARY STORE BEING CONTINUOUSLY OVERWRITTEN WITH THE INFORMATION SIGNAL

(75) Inventor: Adolf Proidl, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/202,021
(22) PCT Filed: Mar. 23, 1998
(86) PCT No.: PCT/IB98/00419
§ 371 (c)(1), (2), (4) Date: Apr. 26, 2001
(87) PCT Pub. No.: WO98/45844
PCT Pub. Date: Oct. 15, 1998

(30) Foreign Application Priority Data

Apr. 8, 1997 (EP) .............................. 97890064

(51) Int. Cl.⁷ .............................. H04N 5/76; H04N 5/92
(52) U.S. Cl. .......................................... 386/95; 386/124
(58) Field of Search ................................ 386/4, 45, 40, 386/52–64, 124, 125, 126, 95; 360/32, 51; 369/32.01, 124.01, 124.07, 124.08; H04N 5/76, 5/92, 9/79, 5/781, 5/783

(56) References Cited

U.S. PATENT DOCUMENTS

| 5,282,092 A | 1/1994 | Wilhelms | 360/5 |
| 5,283,899 A * | 2/1994 | Cook et al. | 709/102 |
| 5,465,120 A * | 11/1995 | Schultheiss | 348/716 |
| 5,737,521 A * | 4/1998 | Klerber et al. | 714/45 |

FOREIGN PATENT DOCUMENTS

| EP | 0 227 530 A1 * | 7/1987 | G11B/20/12 |
| EP | 0 376 800 A1 * | 7/1990 | G08G/1/017 |
| EP | 0 440 017 B1 * | 8/1991 | G11B/19/02 |
| EP | 0 791 927 A2 * | 8/1997 | G11B/27/026 |
| EP | 0 791 927 A3 * | 10/1997 | G11B/27/026 |
| GB | 2 269 930 A * | 2/1994 | G11B/27/036 |
| JP | 08-056327 | * 2/1996 | H04N/5/781 |
| JP | 08-077468 | * 3/1996 | H04N/5/915 |
| JP | 08-242423 | * 9/1996 | H04N/5/781 |

* cited by examiner

*Primary Examiner*—Thai Tran
(74) *Attorney, Agent, or Firm*—Edward W. Goodman (57) ABSTRACT

A device for recording an information signal in a record carrier without loss of part of an information signal at the beginning of a recording, includes a processing circuit for processing an information signal and for supplying a recording information signal, an input device for supplying activation information and wait information, and an operating device for recording, after the activation information, a recording information signal in the record carrier and, after the wait information, for consecutively overwriting storage in a temporary store. An area of the record carrier is selected as the temporary store, and the operating device starts consecutively overwriting storage of a recording information signal in the selected temporary store after the wait information, and stops a consecutively overwriting storage after the activation information.

25 Claims, 4 Drawing Sheets

DEVICE AND METHOD FOR RECORDING AN INFORMATION SIGNAL IN A RECORD CARRIER IN WHICH A TEMPORARY STORE IS FORMED ON THE RECORD CARRIER, THE TEMPORARY STORE BEING CONTINUOUSLY OVERWRITTEN WITH THE INFORMATION SIGNAL

BACKGROUND OF THE INVENTION

1. Field of the Invention

The invention relates to a device for recording an information signal supplied by a signal source in a record carrier without loss of part of the information signal at the beginning of a recording, comprising processing means for processing the information signal and for supplying a recording information signal, input means for supplying activation information and wait information, and operating means, cooperating with at least a part of the processing means and with the input means, for effecting a recording of a recording information signal in the record carrier in dependence upon the occurrence of the activation information, and for effecting a consecutively overwriting storage of the recording information signal in a temporary store at least in dependence upon the occurrence of the wait information.

The invention further relates to a method of recording an information signal in a record carrier without loss of part of the information signal at the beginning of a recording, the method comprising the steps: processing the information signal and supplying a recording information signal, generating activation information and wait information, recording the recording information signal in dependence upon the occurrence of the activation information, and storing, in a consecutively overwriting fashion, the recording information signal in a temporary store at least in dependence upon the occurrence of the wait information.

2. Description of the Related Art

Such a device of the type defined in the first paragraph and such a method of the type defined in the second paragraph, are known, for example, from European Patent Application No. EP 0 440 017 B1, corresponding to U.S. Pat. No. 5,282,092. The known device includes processing means comprising a receiving device and a temporary store which follows the receiving device and is formed by an endless-loop magnetic tape. The length of the endless-loop magnetic tape dictates the maximum recording time of the temporary store. The known device further includes operating means, also comprising the afore-mentioned temporary store, as well as a recording device for recording recording information signals on a record carrier, the record carrier being formed by a magnetic tape, just as the temporary store, but not by an endless-loop magnetic tape, as in the case of the temporary store.

In the known device, received information signals are recorded in the temporary store as recording information signals and are reproduced from the temporary store delayed by the maximum recording time of the temporary store. The recording information signals, which have been reproduced with a time delay, are recorded on the record carrier. Thus, at the beginning of a recording on the record carrier, this recording being initiated by activation information, the recording information signal, recorded in the temporary store before the occurrence of the activation information and subsequently reproduced from the temporary store, is first recorded on the record carrier for a period of time corresponding to the maximum recording time in the temporary store, and subsequently, the recording information signal, received after the occurrence of the activation information and also recorded in the temporary store and then read from the temporary store, is recorded on the record carrier.

However, it has been found that in the known device, the recording information signals recorded on the record carrier have a signal quality which is degraded in comparison with that of the received information signals, this being attributable to the recording in the temporary store and the subsequent read-out from the temporary store. Moreover, the period of time is fixed by the length of the endless-loop magnetic tape and is limited, so that it is not possible to adapt the period of time to the given application. Furthermore, as a result of the fact that recording information signals are recorded on the record carrier delayed by the period of time, this imposes limitations on the use of the device because the period of time needs to pass before any further steps can be taken. Besides, realizing a temporary store by means of an endless-loop magnetic tape is expensive and complicated.

SUMMARY OF THE INVENTION

It is an object of the invention to preclude the aforementioned problems in a device of the type defined in the first paragraph and to improve a device of the type defined in the first paragraph and a method of the type defined in the second paragraph, and provide an improved device and an improved method which guarantee that information signals are recorded without loss of an information signal portion at the beginning of a recording, i.e., at the beginning of a recording process, in a simple manner and by simple means.

According to the invention, in order to achieve this object in a device of the type defined in the first paragraph, an arbitrarily assignable area of the record carrier is selected as temporary store and the operating means starts a consecutively overwriting storage of a recording information signal in an area of the record carrier selected as a temporary store in dependence upon the occurrence of a wait information, and the operating means stops a consecutively overwriting storage of a recording information signal in an area of the record carrier selected as a temporary store, in dependence upon the occurrence of an activation information, and the operating means generates and records a recording information signal which includes information signal packets and address signal packets, the information signal packets corresponding to the information signals and the address signal packets including address information by means of which, during a reproduction of information signal packets recorded in an area of the record carrier selected as temporary store and information signal packets recorded in further areas of the record carrier, the time sequence of the reproduced information signal packets can be defined for the purpose of linking said information signal packets.

By means of the measures in accordance with the invention, it is achieved, in a simple manner, that, as compared with the received information signals, the signal quality of the recording information signals recorded on the record carrier is not degraded as a result of an additional recording process in a separate temporary store and an additional reproduction process from the separate temporary store. Moreover, it is possible to vary the recording time in the temporary store, i.e., the period of time, by selecting or defining an arbitrarily large part of the record carrier as the temporary store, thus enabling the maximum recording time of the temporary store to be adapted to the given case of use, no delayed recording of recording information signals in the record carrier occurs, as a result of which no time limitations are imposed on the use of the device. Furthermore, a substantial cost reduction is achieved in that a separate temporary store is obviated.

In a device in accordance with the invention having the characteristic features defined above, it has proven to be advantageous if, in addition, the operating means generates and records at least one item of linkage address information in dependence upon the occurrence of activation information following the wait information, whereby at least one item of linkage address information, during reproduction of information signal packets recorded in the record carrier, information signal packets reproduced from an area of the record carrier selected as temporary store and further reproduced information signal packets can be linked together in their appropriate time sequence, and by means of which also the first information signal packet recorded in the record carrier in dependence upon the occurrence of activation information can be linked, during reproduction, after the last information signal packet recorded in the area of the record carrier selected as temporary store. Thus, it is achieved, in a simple manner, that during reproduction, the information signal packet recorded in the temporary store directly before the occurrence of activation information, is reproduced directly before the first information signal packet recorded in the record carrier in dependence upon the occurrence of the activation information.

In a device in accordance with the invention having the characteristic features defined above, it has further proven to be advantageous if, in addition, the operating means generates and records at least one item of linkage address information whereby, during reproduction, an information signal packet, recorded in an area of the record carrier selected as temporary store, can be linked after the information signal packet recorded in the record carrier directly before the occurrence of wait information. Thus, a device is obtained in which it is also possible, during reproduction, to insert only a part of the information signal packets recorded in the temporary store into the information signal packets recorded on the record carrier. Consequently, the period of time during which the information signal packets are reproduced from the temporary store, can be selected freely within a time interval not longer than the maximum recording time in the temporary store, and can be adapted to the given application. Such an adaptation of the period of time to an application can also be effected afterwards.

In a device in accordance with the invention having the characteristic features defined above, it has further proven to be advantageous if, in addition, the operating means generates and records at least one item of linkage address information whereby, during reproduction, an information signal packet, recorded in an area of the record carrier selected as temporary store and arranged as the next information signal packet to be overwritten upon termination of the consecutively overwriting storage in the area of the record carrier selected as temporary store, can be linked after the information signal packet recorded in the record carrier directly before the occurrence of wait information. In this way, it is achieved that the maximum recording time in a temporary store to which wait information and activation information is assigned, is used as the period of time, and that during reproduction, all the information signal packets stored in the temporary store are inserted between the information signal packet recorded on the record carrier before the occurrence of the wait information and the information signal packet recorded on the record carrier in dependence upon the activation information. Thus, all the recording information signals recorded on the record carrier are reproduced during reproduction, and the recording capacity of the record carrier is utilized in a particularly advantageous manner.

In a device in accordance with the invention having the characteristic features defined above, it has also proven to be advantageous if, in addition, the operating means generates and records at least one item of linkage address information whereby, during reproduction, an information signal packet, recorded in an area of the record carrier selected as temporary store and arranged at a given distance before the last information signal packet recorded upon termination of the consecutively overwriting storage in the area of the record carrier selected as temporary store, can be linked after the information signal packet recorded in the record carrier directly before the occurrence of wait information. In this way, it is achieved that the period of time is set to a given time which is always the same and corresponds to the given distance, and that information signals recorded during this fixed period of time before the occurrence of activation information, can be reproduced before the information signal packets recorded after the occurrence of the activation information. Moreover, it is possible to prolong the period of time subsequently to the maximum recording time in the temporary store.

In a device in accordance with the invention having the characteristic features defined above, it has further proven to be advantageous if, in addition, the operating means overwrites address information recorded in the record carrier with linkage address information. Thus, it is achieved, in a simple manner, that address information in address signal packets can also be overwritten subsequently by linkage address information and, consequently, an information signal packet associated with an address signal packet can also be re-sequenced afterwards. Moreover, this results in an optimum use of the recording capacity in the record carrier.

In a device in accordance with the invention having the characteristic features above, it has further proven to be advantageous if, in addition, the operating means selects, as the temporary store, an area of the record carrier which directly adjoins that area of the record carrier in which an information signal packet has been recorded immediately before the occurrence of the wait information. In this way, it is achieved that, in the case that the time between the instant at which wait information occurs and the instant at which activation information occurs is shorter than the maximum recording time in the temporary store, the information signal packets recorded in the temporary store are inserted in the information signal packets recorded time-sequentially on the record carrier without address information being overwritten by linkage address information. As a result of this, a defragmentation of information signal packets, as known from the field of computer technology, is not necessary.

In the case of such a defragmentation of information signal packets, information signal packets which, during reproduction, are reproduced directly after one another on the basis of linkage address information, are rearranged in adjacent areas on the record carrier. This provides faster access to the information signal packets during reproduction. For the above application, a device in accordance with the invention does not require defragmentation of information signal packets, which saves processing time in the device and device costs.

Conversely, when the time between the instant at which wait information occurs and the instant at which activation information occurs, is longer than the maximum recording time in the temporary store, the direct contiguity of information signal packets which succeed one another in time on the record carrier is disrupted at not more than three positions, i.e., the beginning of the temporary storage area, the end of the temporary storage area and the end of the recording in the temporary store, the positioning paths to be covered on the record carrier being dictated only by the size of the temporary store, as a result of which they can be kept sufficiently small for any application.

In a device in accordance with the invention having the characteristic features defined above, it has also proven to be advantageous if, in addition, the operating means cooperates with a random-access or quasi-random-access memory as the record carrier. With such a random-access or quasi-random-access memory, which allows a particularly rapid location of a storage address of an information signal packet of an arbitrary area of the record carrier for recording an information signal packet and for reproducing the information signal packet, it is possible to realize a temporary store in a particularly effective manner by means of an arbitrarily definable area of the record carrier.

In a device in accordance with the invention having the characteristic features defined above, it has further proven to be advantageous if, in addition, the device includes a built-in record carrier. In this way, a device in accordance with the invention can be realized in a particularly cheap, compact and mechanically robust manner.

In a device in accordance with the invention having the characteristic features defined above, it has further proven to be advantageous if, in addition, the device further comprises holder means for holding a record carrier and from which a record carrier being held can be removed. In this way, a multiplicity of record carriers can be processed one after the other in the device.

In a device in accordance with the invention having the characteristic features defined above, it has further proven to be advantageous if, in addition, the holder means holds a solid-state memory accommodated in a protective carrier as a record carrier. In a record carrier formed by a semiconductor memory, a part of the record carrier can be defined particularly simply as a temporary store. Moreover, a semiconductor memory does not have any moving parts, as a result of which a long life of the device in accordance with the invention is achieved.

In a device in accordance with the invention having the characteristic features defined above, it has further proven to be advantageous if, in addition, the holder means holds an optically scanned disc as a record carrier. By means of an optically scanned disc, which can be, for example, a DVD-RAM, an MO Disc, a CD Rewritable or an MD Disc, it is also possible to define a very large area of the record carrier as a temporary store in a particularly simple and cheap manner.

In a device in accordance with the invention having the characteristic features defined above, it has also proven to be advantageous if, in addition, the holder means holds a magnetically scanned disc as a record carrier. A magnetically scanned disc, which can, for example, be formed by a hard-disc drive, provides particularly short access times to the information signal packets recorded on the record carrier, as a result of which information signal packets with a very high data rate, for example, video signals, can be reproduced from such a disc with a satisfactory reproduction speed.

In a device in accordance with the invention having the characteristic features defined above, it has further proven to be advantageous if, in addition, the holder means holds a magnetic-tape cassette which accommodates a magnetic tape as a record carrier. In this way, a magnetic tape, which is a very cheap bulk storage device, can be used as record carrier in a device in accordance with the invention.

In a device in accordance with the invention having the characteristic features defined above, it has also proven to be advantageous if, in addition, the device is constructed as a video recorder for recording video signals and audio signals. In this way, a low-cost video recorder is obtained, for which a delayed recording decision does not lead to loss of part of the information at the beginning of a recording.

In a device in accordance with the invention having the characteristic features defined above, it has also proven to be advantageous if, in addition, the device is constructed as a dictation device for recording speech signals, preferably as a speech-controlled dictation device which can be activated by speech signals to be recorded. In this way, a low-cost dictation device is obtained, for which a delayed recording decision does not lead to loss of part of the speech signal at the beginning of a recording and, in the preferential case of a voice-controlled version, a dictation device for speech signal recording is obtained which also, in the case of a recording controlled by a threshold detector, prevents loss of a part of a speech signal at the beginning of a recording.

In a device in accordance with the invention having the characteristic features defined above, it has also proven to be advantageous if, in addition, the device is constructed as a data storage device for recording digital data supplied by a signal source. In this way, digital data received from the data storage device can be tested for validity and relevance for the user, and in the case of a positive test result, the digital data can be recorded without loss of a part of the digital data at the beginning of the recording.

In order to achieve the afore-mentioned object, a method of the type defined in the second paragraph is characterized in that the method includes the further steps: selecting an arbitrarily assignable area of the record carrier as a temporary store, starting a consecutively overwriting storage of a recording information signal in the area of the record carrier selected as the temporary store in dependence upon the occurrence of a wait information, stopping a consecutively overwriting storage of the recording information signal in the area of the record carrier selected as the temporary store in dependence upon the occurrence of activation information, and generating and recording the recording information signal, which includes information signal packets and address signal packets, the information signal packets corresponding to the information signals and the address signal packets including address information, whereby, during a reproduction of information signal packets recorded in an area of the record carrier selected as temporary store and information signal packets recorded in further areas of the record carrier, the time sequence of the reproduced information signal packets can be defined for the purpose of linking said information signal packets. In this way, advantages which correspond to the advantages described hereinbefore for a device in accordance with the invention having the characteristic features defined above, are obtained for a method in accordance with the invention.

The afore-mentioned aspects as well as further aspects of the invention will be apparent from the embodiments described hereinafter by way of examples and will be elucidated with reference to these embodiments.

BRIEF DESCRIPTION OF THE DRAWINGS

The invention will now be described in more detail with reference to four embodiments shown in the drawings and given by way of examples, but to which the invention is not limited, in which.

DESCRIPTION OF THE PREFERRED EMBODIMENTS

Figure 1:
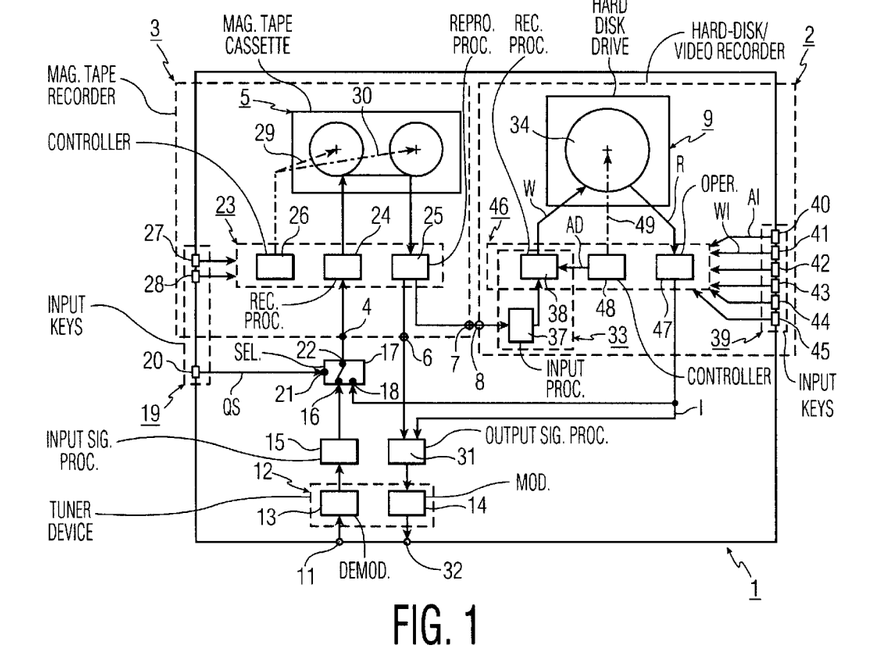
FIG. 1 shows, diagrammatically, a combined video recorder/hard disk apparatus by means of which video films can be edited and which includes a device in accordance with a first embodiment of the invention.

FIG. 1 shows, diagrammatically, a combined video recorder/hard disk apparatus, hereinafter referred to as the apparatus 1, and which includes a device 2 in accordance with a first embodiment of the invention.

The apparatus 1 comprises a magnetic-tape video recorder section 3, which is constructed to record a video signal, applied to a video input 4 of the magnetic-tape video recorder section 3, on a magnetic-tape cassette 5. The magnetic-tape video recorder section 3 is further constructed to reproduce a video signal recorded on a magnetic-tape cassette 5 and to supply the reproduced video signal to a first video output 6 and a second video output 7. The apparatus 1 further has a hard-disk/video recorder section which forms the device 2, this device 2 having an information input 8 connected to the second video output 7 of the magnetic-tape video recorder section 3. The device 2 further has a hard-disk drive 9 and is constructed to record an information signal in the hard-disk drive 9 without loss of an information signal portion 10 at the beginning of a recording, this information signal being supplied from the magnetic-tape video recorder section 3, which now forms a signal source for the device 2, to the information signal input 8 of the device 2. The device 2 is further constructed to reproduce information signals I from the hard-disk drive 9.

By means of the apparatus 1, a video film recorded on the magnetic tape of a magnetic-tape cassette 5 can be reproduced by the magnetic-tape video recorder section 3, the device 2 enabling only information signal portions of the video film which are desired by the user to be recorded on the magnetic disc of the hard-disk drive 9. Thus, the apparatus 1 can be used as a video editing apparatus.

The apparatus 1 has an input 11 at which the apparatus 1 can receive a television signal from a signal source not shown in FIG. 1. The apparatus 1 includes a tuner device 12 having a demodulator 13 and a modulator 14. The demodulator 13 is connected to the input 11 of the apparatus 1, via which a television signal supplied to the input 11 can be applied to the demodulator 13. A television signal which has been demodulated by the demodulator 13 can be applied as a video signal to input signal processing means 15. In the input signal processing means 15, the video signal is applied to and processed by a plurality of filter stages and amplifier stages, not shown in FIG. 1, in known manner. A processed video signal supplied by the input signal processing means 15 can be applied to a first input 16 of an input source selector 17. The input source selector 17 has a second input 18 via which information signals reproduced by the hard-disk drive 9 of the device 2 can be applied to the input source selector 17.

The apparatus 1 has input means 19 for controlling the magnetic-tape video recorder section 3. The input means 19 includes a recording source selection key 20 via which a control signal QS can be supplied to a control input 21 of the input source selector 17. Depending on the control signal QS supplied by the recording source selection key 20, the input source selector 17 connects its first input 16 or its second input 18 to an output 22 of the input source selector 17. The output 22 of the input source selector 17 is connected to the video input 4 of the magnetic-tape video recorder section 3. As a consequence, either a processed video signal supplied by the input signal processing means 15 or an information signal I reproduced by the device 2 can be applied to the video input 4 of the magnetic-tape video recorder section 3.

The magnetic-tape video recorder section 3 comprises operating means 23 including recording processing means 24, reproduction processing means 25 and control means 26. The recording processing means 24 is connected to the video input 4. The recording processing means 24 includes filter stages and amplifier stages, which are not shown in FIG. 1. The recording processing means 24 processes a video signal received from the video input 4 into a recording video signal for recording on a magnetic tape of the magnetic-tape cassette 5.

In the magnetic-tape video recorder section 3, the input means 19 comprises a recording key 27 for activating a recording mode in the magnetic-tape video recorder section 3. The control means 26 of the operating means 23 is constructed to control the recording of recording video signals supplied by the recording processing means 24 on the magnetic tape of the magnetic-tape cassette 5 when the recording mode is active. For this purpose, the control means 26 controls the transport speed of the magnetic tape in the recording mode in known manner, not shown, via two diagrammatically shown operating connections 29 and 30. The magnetic tape is then moved past a scanner, not shown in FIG. 1, a recording video signal being recorded on the magnetic tape, as is well-known, by means of magnetic heads in this scanner when the magnetic-tape video recorder section 3 is in the recording mode.

The input means 19 further has a reproduction key 28 for activating a reproduction mode in the magnetic-tape video recorder section 3. The control means 26 is constructed to control the reproduction of recording video signals recorded on the magnetic tape of the magnetic-tape cassette when the reproduction mode is active. For this purpose, the control means 26 controls the transport speed of the magnetic tape of the magnetic-tape cassette in known manner via the two operating connections 29 and 30. The reproduction video signals reproduced from the magnetic tape of the magnetic-tape cassette 5 in the reproduction mode can be applied to the reproduction processing means 25. The reproduction processing means 25 includes filter stages and amplifier stages, which are not shown in FIG. 1. The reproduction processing means 25 processes an applied reproduction video signal, this processed video signal being applied both to the first video output 6 and to the second video output 7 of the magnetic-tape video recorder section 3.

A video signal supplied to the first video output 6 of the magnetic-tape video recorder section 3 can be applied to output signal processing means 31. The output signal processing means 31 processes a video signal by means of filter stages and amplifier stages, which are not shown in FIG. 1. A processed video signal supplied by the output signal processing means 31 is applied to the modulator 14 of the tuner device 12. A video signal which has been modulated in the modulator 14 is applied to an output 32 of the apparatus 1, and from this output 32 to an apparatus which can be connected to the output 32, for example, a television set, which is not shown in FIG. 1. Moreover, information signals I reproduced by the hard-disk drive 9 of the device 2 can be applied to the output signal processing means 31, these information signals I being applicable from the output signal processing means 31 to a television signal connected to the output 32, via the modulator 14 and the output 32.

The device 2 has processing means 33 for processing an information signal, which is applied to the information signal input 8 of the device 2 and, in the present case, is formed by a video signal reproduced from the magnetic tape of the magnetic-tape cassette 5, and for supplying a recording information signal W. A recording information signal W can be stored in an area of a record carrier, which in the present case is formed by a magnetically-scanned disc 34 of the hard-disk drive 9, this signal being stored in information signal sections 10, predecessor address signal sections 35 and successor address signal sections, as will be described in more detail hereinafter in the description of an area of a magnetic disc 34 shown in FIG. 2.

The processing means 33 includes input processing means 37 and further recording processing means 38. The input processing means 37 includes filter stages, an analog-to-digital converter stage, a compression stage and amplifier stages, which are not shown in FIG. 1. The input processing means 37 processes an information signal applied from the information signal input 8 to the input processing means 37. A processed information signal is supplied from the input processing means 37 to the further recording processing means 38. The further recording processing means 38 processes an information signal applied to it by the input processing means 37 and supplies a recording information signal W to the hard-disk drive 9, as will be described in more detail hereinafter.

The device 2 further has further input means 39 which includes a cut-in key 40, a position key 44 and a linkage key 45. In the present case, the further input means 39 supplies control information to further operating means 46 provided in the device 2. The further operating means 46 includes the further recording processing means 38, further reproduction processing means 47 and further control means 48. The further control means 48 controls the speed of the magnetic disc 34 and the position of a magnetic head, not shown in FIG. 1, relative to the magnetic disc 34 in a recording mode and a reproduction mode in known manner via a further operating connection 49. The further control means 48 further generates address information AD corresponding to the instantaneous position of the magnetic head, and supplies this address information AD to the further recording processing means 38.

The further reproduction processing means 47 includes a digital-to-analog converter stage, a decompression stage, filter stages and amplifier stages, which are not shown in FIG. 1. The further reproduction processing means 47 processes reproduction information signals R.

Activation information AI can be supplied to the further operating means 46 by means of the cut-in key 40, this information enabling a continuous recording mode to be activated in the device 2. The further operating means 46 continuously records a recording information signal W on the magnetic disc 34 of the hard-disk drive 9 in the continuous recording mode, as is shown in FIG. 2.

By means of the cut-out key 41, wait information WI can be supplied to the further operating means 46, thereby enabling a wait recording mode to be activated in the device 2. The further operating means 46 designates an area of the magnetic disc 34 as a temporary store 50, this being effected when the device 2 is set to the wait recording mode. The further operating means 46 further starts the consecutive overwriting storage of a recording information signal W in the area of the magnetic disc 34 forming the temporary store 50 in dependence upon the occurrence of wait information WI, such starting being effected when the wait recording mode is active in the device 2. The further operating means 46 further terminates a consecutive overwriting storage of a recording information signal W in the temporary store 50 in dependence upon the occurrence of activation information AI, such a termination being effected when, in the wait recording mode of the device 2, the continuous recording mode is activated.

Figure 2:
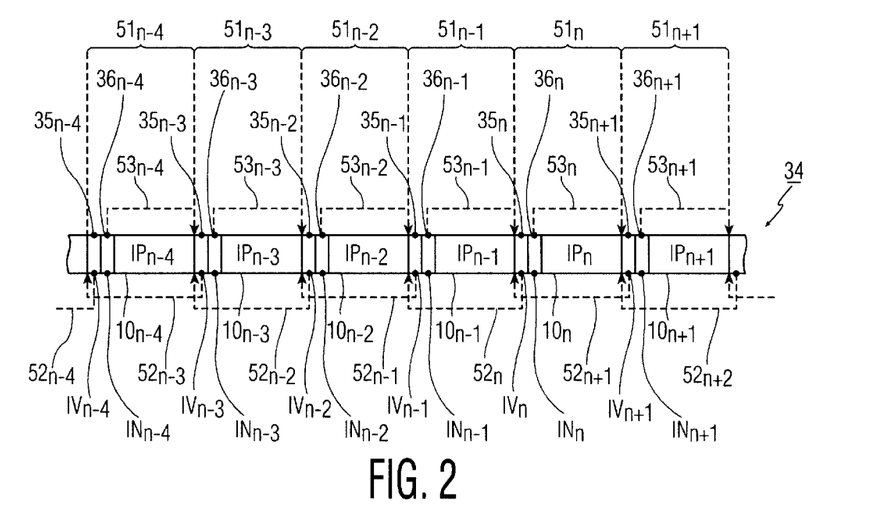
FIG. 2 shows, diagrammatically, an area of a magnetic disc of a hard-disk drive of device in accordance with the invention included in the apparatus shown in FIG. 1, in which area a recording information signal is stored in information signal packets and address signal packets.

FIG. 2 represents, diagrammatically, an area of the magnetic disc 34 of the hard-disk drive 9 in which a recording information signal W is stored in information signal sections 10 and in address signal sections formed by predecessor address signal sections 35 and successor address signal sections 36. Information signal packets IP recorded on the magnetic disc 34 in information signal sections 10 correspond to the information signals because, in the input processing means 37, the information signals applied to the information signal input 8 of the device 2 are digitized by the analog-to-digital converter stage, are subsequently compressed by the compression stage, and are then recorded as a compressed digital signal in the information signal packets IP. It is to be noted that the information signals can alternatively be stored as analog signals in information signal packets IP, as is described for a fourth embodiment of the device in accordance with the invention shown in FIG. 8. By means of address information AD contained in predecessor address packets IV and successor address packets IN recorded in address signal sections on the magnetic disc 34, the time sequence of the reproduced information signal packets IP is defined for the purpose of linking these packets—in the case of a reproduction of information signal packets IP recorded in an area of the magnetic disc 34 selected as the temporary store 50 (see FIG. 3) and information signal packets IP recorded in further areas of the magnetic disc 34. An information signal packet $IP_n$ is then associated with a predecessor address packet $IV_n$ and a successor address packet $IN_n$, these three packets forming an aggregate packet $51_n$.

The predecessor address packet $IV_n$ of the aggregate packet $51_n$ contains address information specifying a position on the magnetic disc 34, this position being marked symbolically by a successor pointer link $53_n$ in FIG. 2. The successor pointer link $53_n$ marks the position on the magnetic disc 34 where the aggregate packet $51_{n+1}$ is stored on the magnetic disc 34.

In a reproduction mode, to which the device 2 can be set by the actuation of a reproduction key 43, the sequence of the reproduced information signal packets IP is defined by the address information AD stored in the predecessor address packets IV and in the successor address packets IN. In the reproduction mode, the aggregate packets 51, which form the reproduction information signal R and which are reproduced in the correct sequence under control of the further control means 48, are decompressed by the decompression stage and converted into an analog signal by the digital-to-analog converter stage in the further reproduction processing means 47, this analog signal being applied to both the second input 18 of the input source selector 17 and to the output signal processing means 31 as a reproduced information signal I.

In computer technology, such a linkage of information signal packets IP with predecessor address packets IV and successor address packets IN is known as a double linked list. It is to be noted that the measures in accordance with the invention can also be applied in conjunction with a single linked list in which information signal packets IP are linked either exclusively by predecessor address packets IV or exclusively by successor address packets IN, as will be described in more detail with reference to the fourth embodiment of the invention. If the information signal packets should be reproducible both in a normal reproduction mode and in a reverse reproduction mode, comparable to a physical film, the use of a double linked list is imperative.

Figure 3:
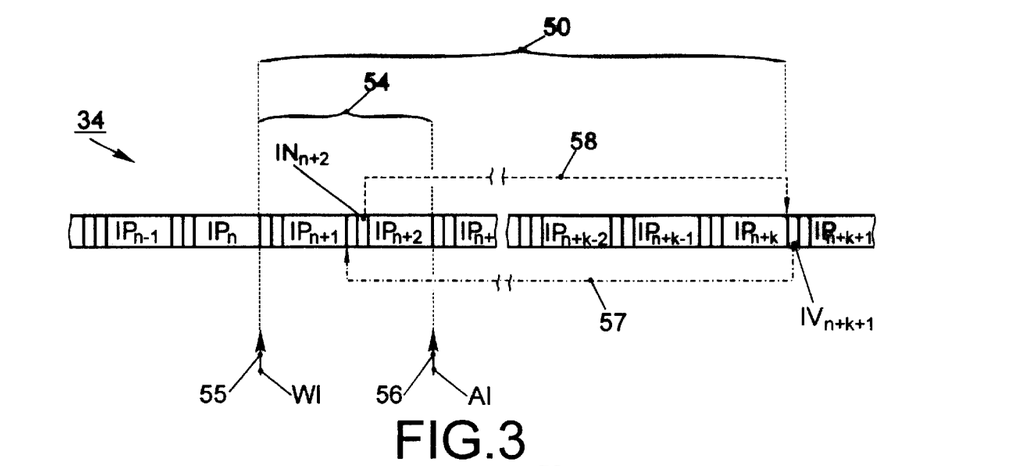
FIG. 3, similarly to FIG. 2, shows, diagrammatically, an area of the magnetic disc of the hard-disk drive, which area forms a temporary store, and in which a part of the information signal packets stored in the temporary store is inserted by means of linkage address information in information signal packets recorded in other areas of the record carrier.

FIG. 3 shows, diagrammatically, an area of the magnetic disc 34 of the hard-disk drive 9 of the device 2, this area forming a temporary store 50 and in which information signal packets IP stored in a first merging section 54 have been merged with information signal packets IP recorded in other areas of the magnetic disc 34.

When the apparatus 1 is used as a video editor and a video film recorded on the magnetic tape of a magnetic-tape cassette 5 is to be edited, of which video film the user of the apparatus 1 wishes to record only desired information signal portions of the video signal on the hard-disk drive 9, the video signal can be reproduced from the magnetic tape of the magnetic-tape cassette 5 by actuation of the reproduction key 28 of the magnetic-tape video recorder section 3. The user of the apparatus 1 can view the reproduced video film on a television set connected to the output 32 of the apparatus 1. While viewing the video film, the user of the apparatus 1 can store a desired fragment of the video film on the magnetic disc 34 by actuating the cut-in key 40 and can terminate the storage, previously started by actuation of the cut-in key 40, by actuating the cut-out key 41 when an undesired fragment of the video film begins. Since the user of the apparatus 1 decides whether the fragment just viewed is desired or is not desired while the video film is being viewed, the recording decision of the user by actuation of the cut-in key 40 is generally taken too late. In order to avoid losing a part of the video film when the recording begins in spite of a late recording decision of the user, the video film is stored in the temporary store 50 by consecutive overwriting after actuation of the cut-out key 41. Thus, for a period of time selected by the user of the apparatus 1, this time being not longer than the maximum recording time in the temporary store 50, a part of the video film reproduced by the magnetic-tape video recorder section 3 before the actuation of the cut-in key 40 can be reproduced during reproduction from the hard-disk drive 9 and is therefore not lost. The maximum recording time in the temporary store 50 can be, for example, ten (10) seconds and the selected period of time can be five (5) seconds, but after the recording, the user of the apparatus 1 can subsequently also define another period of time, which will be discussed in more detail hereinafter.

By the actuation of the cut-in key 40 of the device 2, the device 2 can be set to the continuous recording mode and the video signal reproduced from the magnetic tape of a magnetic-tape cassette 5 can be stored in the magnetic disc 34 of the hard-disk drive 9 as a recording information signal. In the continuous recording mode, the recording information signal is recorded in information signal sections 10 and address signal sections 35 and 36 shown in FIG. 2. Upon the occurrence of first activation information AI, the recording is started in a first aggregate packet $51_1$ and is subsequently continued in the aggregate packet $51_2$ and the subsequently inserted aggregate packets $51_3$, $51_4$, $51_5$ and further aggregate packets 51.

When the user of the video recorder does not wish to record a part of the reproduced video signals on the magnetic disc 34, the device 2 can be set to the wait recording mode by actuation of the cut-out key 41, upon which wait information 55 is generated. The further operating means 46 now defines a temporary storage area of the magnetic disc 34 store in dependence on the occurrence of wait information WI. The further operating means 46 particularly defines, as a temporary store, an area of the magnetic disc 34 which directly adjoins that area of the magnetic disc 34 in which an information signal packet $IP_n$ has been recorded immediately before the occurrence of wait information WI. Consequently, when the aggregate packet $51_n$ is recorded and the wait information 55 occurs, the further operating means 46 defines, as a temporary store, an area of the magnetic disc 34 which directly adjoins the aggregate packet $51_n$ recorded upon the occurrence of wait information 55. The temporary store 50 can store k aggregate packets 51. The maximum recording time in the temporary store 50 can be defined and adapted to the wishes of the user of the video editor by defining the number k of aggregate packets 51 which can be stored in the temporary store.

When, after actuation of the cut-out key 41, the user of the apparatus 1 actuates the cut-in key 40 within the maximum recording time of the temporary store 50 because the user wishes to record the part of the video film just reproduced by the magnetic-tape video recorder section 3, the aggregate packets 51 are recorded in the manner illustrated in FIG. 2. The aggregate packets 51 are then recorded on the magnetic disc 34 as though the continuous recording mode had not been interrupted. In this case, the information signal packets IP are suitably recorded on the magnetic disc 34 in sequence required for reproduction and specified by the predecessor address packets IV and the successor address packets IN. As a result of this, a defragmentation of information signal packets IP, as known from the field of computer technology, is not necessary, thus providing a particularly rapid access to the information signal packets IP, which guarantees a very good reproduction performance of the device 2 in the apparatus 1.

When, in the wait recording mode, no activation information AI is generated in response to actuation of the cut-in key 40 for a recording time longer than the maximum recording time in the temporary store 50, a consecutive overwriting storage of a recording information signal W in the temporary store 50 is possible with the aid of the further operating means 46. After recording of the information signal packet $IP_{n+k}$, recording is then continued in the aggregate packet $51_{n+1}$, the information signal packet $IP_{n+1}$ and consecutive further information signal packets IP then being overwritten by information signal packets IP of the recording information signal W which are to be recorded. However, only the information signal packets IP are then overwritten but not the address signal packets in the temporary store 50, so that the linkage of the aggregate packets 51 is maintained by the address signals packets recorded in the address signal sections until first activation information 56 occurs.

When, during recording in the wait recording mode, the first activation information 56 occurs in the information signal packet $IP_{n+2}$, linkage address information IR is stored in the successor address packet $IN_{n+2}$, this information signal indicating a position on the magnetic disc 34 marked, symbolically, by a successor pointer link 58 and from which a recording information signal W can be recorded in the information signal packet $IP_{n+k+1}$ after the occurrence of the activation information 56. Moreover, upon the occurrence of the activation information 56, further linkage address information IR is stored in the predecessor address packet $IV_{n+k+1}$ to indicate a position on the magnetic disc 34, this position being marked, symbolically, by a first predecessor pointer link 57 in FIG. 2 and from which position, the aggregate packet 512 last recorded in the temporary store 50 is recorded. The further operating means 46 then overwrites address information stored in an address signal packet with linkage address information IR. By means of said logging of the linkage of the aggregate packets 51 stored in the temporary store 50, it is achieved that, during reproduction, the information signal packets IP are linked as follows: $IP_{n-1} \rightarrow IP_n \rightarrow IP_{n+1} \rightarrow IP_{n+2} \rightarrow IP_{n+k+1}$.

Thus, it is achieved that during reproduction, in dependence on the occurrence of the activation information 56, the information signal packet $IP_{n+k+1}$, recorded as the first information signal packet in the magnetic disc 34 of the hard-disk drive 9, is linked after the last information signal packet $IP_{n+2}$ recorded in the area of the magnetic disc 34 selected as the temporary store 50. As a result of this, only a part of the information signal packets IP stored in the temporary store 50, in the present case, the first merging section 54, is inserted into the information signal packets IP recorded in the magnetic disc 34 before the occurrence of the wait information 55 and after the occurrence of the activation information 56. The length of time of the reproduction of the information signal packets $IP_{n+1}$ and $IP_{n+2}$ stored in the first merging section 54 then indicates the period of time. The period of time can also be changed subsequently, as will be described in more detail hereinafter.

When, after completion of video film editing process, the user of the apparatus 1 views information signals reproduced from the hard-disk drive 9 of the device 2 by a television set connected to the output 32 of the apparatus 1 in a reproduction mode activated by the further reproduction key 43, the user can observe that the period of time dictated by the size of the first merging section 54 is too short. By actuation of the position key 44, the device 2 can be set to a positioning mode in which all the information signal packets IP stored in the temporary store 50, including those not linked by linkage address information IR, can be reproduced. When the user of the apparatus 1 actuates the linkage key 45 in the positioning mode, during the reproduction of information signals stored in the information signal packet $IP_{n+3}$, the predecessor address packets IV and the successor address packets IN are overwritten with such linkage address information IR that, during reproduction, the information signal packets IP are linked as follows: $IP_{n-1} \rightarrow IP_n \rightarrow IP_{n+1} \rightarrow IP_{n+2} \rightarrow IP_{n+3} \rightarrow IP_{n+k+1}$. In this way, the period of time can also be changed after editing of the video film, the maximum period of time being equal to the maximum recording time in the temporary store 50.

Figure 4:
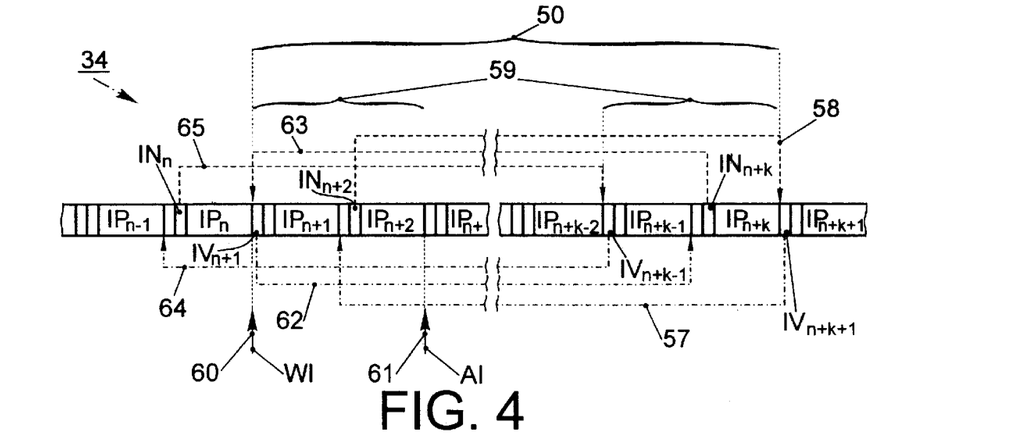
FIG. 4, similarly to FIGS. 2 and 3, shows, diagrammatically, a further area of the magnetic disc of the hard-disk drive, which area forms a temporary store, and in which two parts of the information signal packets stored in the temporary store are inserted by means of linkage address information in information signal packets recorded in other areas of the record carrier.

FIG. 4 shows, diagrammatically, a further area of the magnetic disc 34 of the hard-disk drive 9 of the device 2, this further area forming a temporary store 50 and in which information signal packets IP stored in second merging section 59 comprising two parts are included in information signal packets IP recorded in other areas of the magnetic disc 34 with the aid of plurality of linkage address information IR. When, in a manner not shown in FIG 1, the device 2 has been set to a period of time T1 which corresponds to the reproduction time of four information signal packets IP, the concatenation of information signal packets IP, shown in FIG. 4, can be obtained in dependence on the occurrence of second wait information 60 and second activation information 61.

When, after the occurrence of the wait information 60 for the first time, a recording is made in the $k^{th}$ aggregate packet $51_{n+k}$ stored in the temporary store 50, linkage address information IR, which indicates a position marked by a second successor pointer link 63 on the magnetic disc 34, is stored in the successor address packet $IN_{n+k}$. In the predecessor address packet $IV_{n+1}$, linkage address information IR is stored which indicates a position marked by a second predecessor pointer link 62 on the magnetic disc 34. By means of the second predecessor pointer link 62 and the second successor pointer link 63, it is achieved that, during reproduction, the information signal packet $IP_{n+k}$ precedes the information signal packet $IP_{n+1}$.

Upon the occurrence of the second activation information 61, just as in the case of the first activation information 56 indicated in FIG. 3, linkage address information IR is stored to define a predecessor pointer link 57 and a successor pointer link 58. By means of the predecessor pointer link 57 and the successor pointer link 58, the first information signal packet $IP_{n+k+1}$, stored in the magnetic disc 34 upon the occurrence of the activation information 61, is included after the last information signal packet $IP_{n+2}$ recorded in the area of the magnetic disc 34 selected as the temporary store 50.

Furthermore, when the activation information 61 occurs, linkage address information IR, which indicates a position marked by a third successor pointer link 65 on the magnetic disc 34, is stored in the last successor address packet $IN_n$ recorded before the occurrence of the wait information 60. Corresponding linkage address information IR is stored in the predecessor address packet $IV_{n+k-1}$ and indicates a position marked by a third predecessor pointer link 64 on the magnetic disc 34. With the aid of the further operating means 46, it is then possible to generate and record the linkage address information IR by means of which the information signal packet $IP_{n+k+1}$, recorded in the temporary store 50 which is arranged at a given distance defined by then period of time T1 before the last information signal packet $IP_{n+2}$ recorded upon termination of the consecutively overwriting storage in the temporary store 50 and which, during reproduction, is arranged after the information signal packet $IP_n$ recorded directly before the occurrence of the wait information 60.

In this way, it is achieved that, during reproduction, the information signal packets IP recorded in the second merging section 59 are included in the information signal packets IP recorded in the magnetic disc 34 before the occurrence of the wait information 60 and after the occurrence of the activation information 61. Consequently, this yields the following sequence of information signal packets IP during reproduction of information signal packets IP from the area of the magnetic disc 34 shown in FIG. 5: $IP_{n-1} \to IP_n \to IP_{n+k-1} \to IP_{n+k} \to IP_{n+1} \to IP_{n+2} \to IP_{n+k+1}$.

As a result, the advantage is obtained that an information signal segment with a given period of time T1, corresponding to the second merging section 59, which has been reproduced before actuation of the cut-in key 40 by the user of the apparatus 1, is not lost.

It is to be noted that, alternatively, the record carrier can be formed by a plurality of stand-alone record carriers, for example, by two hard-disk drives, which can be controlled by the further operating means 46 as a single logical record carrier. This may lead to a cost reduction because a plurality of record carriers, which each have a comparatively low storage capacity, are cheaper than one record carrier having a high storage capacity.

Figure 5:
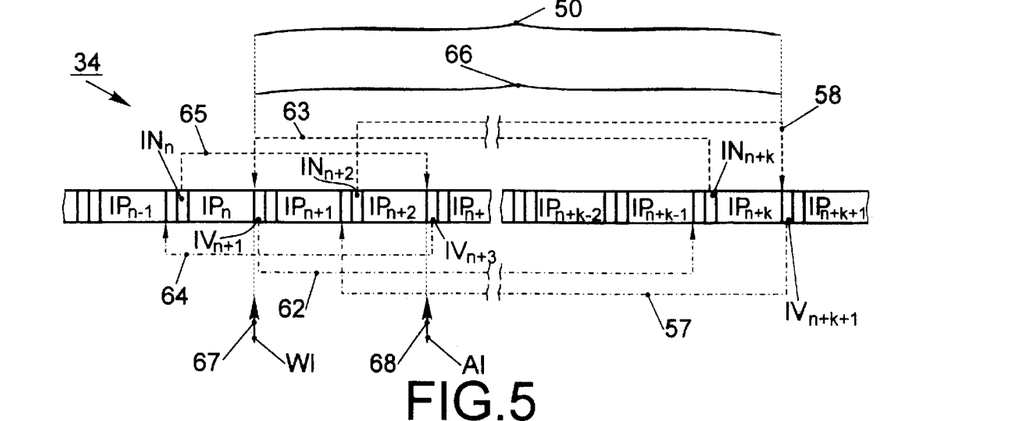
FIG. 5, similarly to FIGS. 2, 3 and 4, shows, diagrammatically, an area of the magnetic disc of the hard-disk drive, which area forms a temporary store, and in which all the information signal packets stored in the temporary store are inserted by means of linkage address information in information signal packets recorded in other areas of the record carrier.

FIG. 5 shows, diagrammatically, an area of the magnetic disc 34 of the hard-disk drive 9 of the device 2, this area forming a temporary store 50, all the information signal packets IP stored in the temporary store 50 being included in information signal packets IP recorded in other areas of the magnetic disc 34 by means of plural linkage address information IR. When in the device 2, in a manner not shown in FIG. 1, the period of time is defined as the maximum recording time in the temporary store 50, a third merging section 66, which comprises all the information signal packets IP stored in the temporary store 50, is included between information signal packets IP recorded before the occurrence of third wait information 67 and after the occurrence of third activation information 68, during reproduction. Linkage address information IR for the first predecessor pointer link 57, the first successor pointer link 58, the second predecessor pointer link 62 and the second successor pointer link 63, is then laid down in a manner similar to that already described for the arrangement of information signal packets IP as shown in FIG. 4. Conversely, linkage address information IR is laid down in the predecessor address packet $IV_{n+3}$ and in the successor address packet $IN_n$, and, consequently, the third predecessor pointer link 64 and the third successor pointer link 65, is defined in such a manner that during reproduction the next information signal packet $IP_{n+3}$, to be overwritten upon termination of the consecutively overwriting storage in the temporary store 50, is arranged after the information signal packet $IP_n$ recorded in the magnetic disc 34 directly before the occurrence of the wait information 67. As a result of this, the following arrangement of the information signal packets IP is obtained during reproduction of information signal packets IP from the area of the magnetic disc 34 shown in FIG. 5: $IP_{n-1} \to IP_n \to IP_{n+3} \to \ldots \to IP_{n+k-2} \to IP_{n+k-1} \to IP_{n+k} \to IP_{n+1} \to IP_{n+2} \to IP_{n+k+1}$.

In this way, it is achieved that the maximum recording time in the temporary store 50 is utilized as the period of time. Thus, during reproduction, all the recording information signals W recorded on the record carrier are reproduced, and the recording capacity of the hard-disk drive 9 is utilized in a particularly advantageous manner.

In an advantageous manner, the magnetic disc 34 of the hard-disk drive 9 is chosen as a record carrier in the device 2 in accordance with the first embodiment of the invention, this disc forming a random access memory and guaranteeing a random access to the information signal packets IP stored in the memory. Furthermore, such a random access memory is particularly suitable for the storage and reproduction of information signal packets IP recorded in a temporary store and in other areas of the record carrier. The use of a hard-disk drive 9 enables particularly short access times and guarantees a satisfactorily rapid reproduction of information signal packets to be reproduced at a very high data rate.

It is to be noted that a record carrier area which can be defined as a temporary store 50 can also consist of a plurality of areas or of a plurality of record carriers which are combined to form one logical area by linkage with the aid of address information AD included in address signal packets 35 and 36. This address information AD may also include information about the record carrier.

It is to be noted that an editing process of a video film can also be started by actuation of the cut-out key 41, in which case, an area of the magnetic disc 34 is defined as a temporary store 50 for a consecutively overwriting storage right at the beginning of the editing process.

Figure 6:
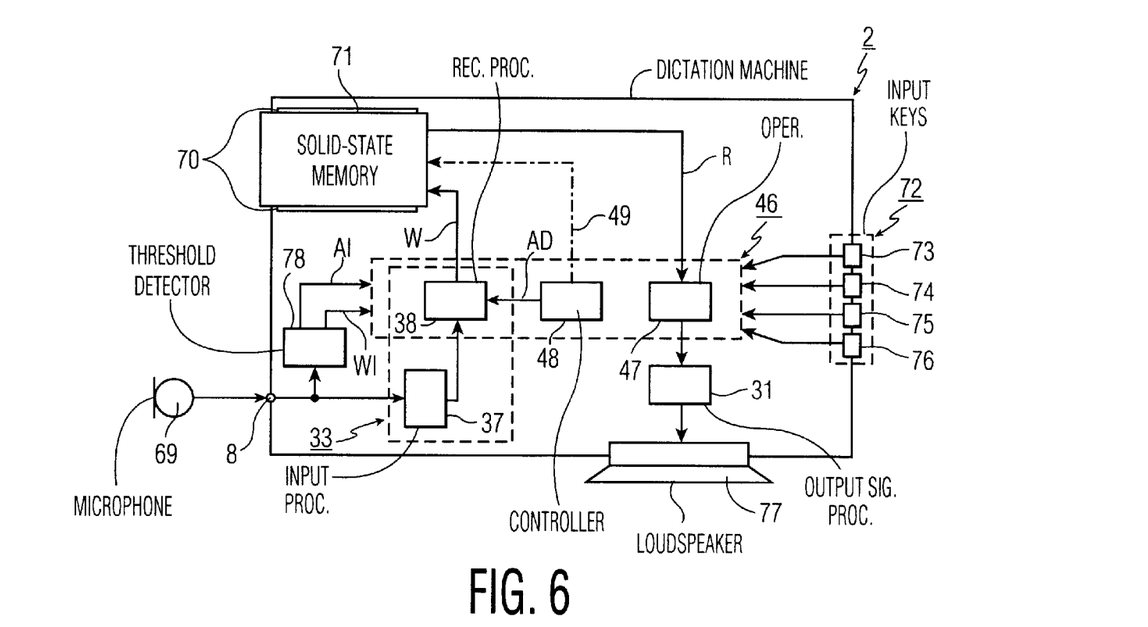
FIG. 6 shows, diagrammatically, a device in accordance with a second embodiment of the invention, which is constructed as a dictation machine for the recording of speech signals and which is constructed to be activated by speech signals to be recorded.

FIG. 6 shows, diagrammatically, a device 2 in accordance with a second embodiment of the invention, which is constructed as a dictation machine for the recording of speech signals and which is constructed to be activated by speech signals to be recorded. A microphone 69 can be connected to an information signal input 8 of the device 2 to supply a speech signal to the device 2. Speech signals can be supplied from the information signal input 8 to processing means 33 which is constructed to supply a recording information signal W.

The device 2 shown in FIG. 6 includes holder means 70 for receiving a record carrier and from which an inserted record carrier can be removed again. Thus, it is achieved that the device 2 can handle a multiplicity of record carriers one after the other. The record carrier is then formed by a solid-state memory 71 accommodated in a protective carrier, known as a so-called PCMCIA card (lap-top card).

The device 2 has input means 72 including a recording key 73, a stop key 74, a position key 75 and a reproduction key 76. By actuating the recording key 73, a wait recording mode can be activated. The device 2 can be set to a further recording mode, namely, a continuous recording mode, which will be described in more detail hereinafter. When the recording mode is active, a recording information signal W supplied by the processing means 33 is stored in the solid-state memory 71, the relevant memory address being defined by control means 48 of the operating means 46 via an operating connection 49. By actuating the reproduction key 76, a reproduction mode can be activated. When the reproduction mode is active, the memory address in the solid-state memory 71, from which a reproduction information signal R can be reproduced from the solid-state memory 71, can be defined by actuation of the position key 75. A reproduction information signal R can be processed in reproduction processing means 47 of the operating means 46 and can be supplied to the output signal processing means 31. A reproduction information signal R processed in the output signal processing means 31 can be applied as a speech signal to a loudspeaker 77 of the device 2, this loudspeaker being connected to the output signal processing means 31. Both the recording modes and the reproduction mode can be deactivated by actuation of the stop key 74.

The device 2 now has a threshold detector 78 connected to the information signal input 8 and arranged to receive a speech signal from the microphone 69. The threshold detector 78 is constructed to compare the amplitude of a speech signal applied to it with a given threshold value and to obtain by this comparison information about the level of a speech signal received from the microphone 69 or of merely a noise signal. The threshold detector 78 is constructed to supply activation information AI if the comparison in the threshold detector 78 indicates that the amplitude of a speech signal applied to the threshold detector 79 is higher than the threshold value. The threshold detector 78 is constructed to supply wait information WI if the comparison in the threshold detector 78 indicates that the amplitude of a speech signal applied to the threshold detector 79 or of merely a noise signal is below the threshold value. Both the activation information AI and the wait information WI can be applied from the threshold detector 78 to the operating means 46.

When the device 2 has been set to the wait recording mode by actuation of the recording key 73, the operating means 46 is responsive to an appropriate control signal from the threshold detector 78 to store a recording signal W by consecutive overwriting in an area of the solid-state memory 71 which can be selected as a temporary store 50, which is effected in a manner similar to that shown in FIG. 5 and described with reference to FIG. 5. The temporary store 50 may then have a maximum recording time of, for example, two (2) seconds.

When the device 2 has been set to the wait recording mode and the user of the dictation device formed by the device 2 begins to speak into the microphone 69, the threshold detector 78 detects a speech signal of adequate amplitude and supplies activation information AI to the operating means 46. When activation information AI occurs, the device 2 is set to the continuous recording mode, in which the operating means 46 effect a continuous storage of a recording information signal W in the solid-state memory 71, as already described for the corresponding case with reference to FIG. 5.

The detection process in the threshold detector 78 and the processing times from the occurrence of activation information AI till the actual recording of a recording information signal W in the solid-state memory 71 lead to a delayed activation of the speech-controlled continuous recording mode. This delay of the activation of the speech-controlled continuous recording mode can be, for example, 1 to 2 seconds. Suitably, the recording information signal W recorded in the temporary store 50 is merged with recording information signals recorded in further areas of the solid-state memory, as already described for the corresponding case with reference to FIG. 5. This also precludes a loss of a part of a speech signal at the beginning of the recording in the case of speech-controlled activation of the recording mode.

Figure 7:
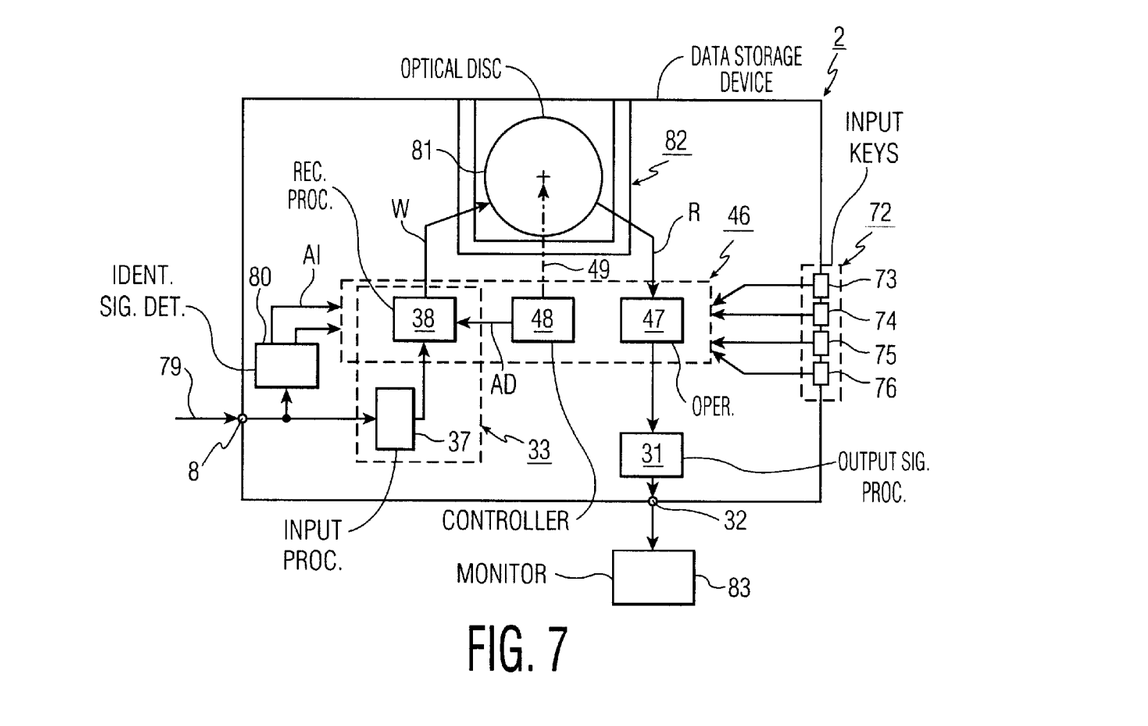
FIG. 7 shows, diagrammatically, a device in accordance with a third embodiment of the invention, which is constructed as a data storage device for the recording of digital data supplied by a signal source.

FIG. 7 shows, diagrammatically, a device 2 in accordance with a third embodiment of the invention, which is constructed as a data storage device, for example, in a personal computer, for the recording of digital data supplied by a signal source. The device 2 has an information signal input 8 connected to a data network by a data line 79, this data network forming a signal source. The data network can be, for example, a telephone network, a cable TV system or the Internet. The digital data supplied by the data network can be text data, graphic data, acoustic data or other information data. The digital data applied to the information signal input 8 can be applied to processing means 33 for supplying a recording information signal W and to an identification signal detector 80. By actuating a recording key 73, a wait recording mode can be activated. The device 2 can be set to a further recording mode, namely, a continuous recording mode, which will be described more detail hereinafter. In the recording mode, a recording information signal W supplied by the processing means 33 can be stored in a magneto-optical disc 81, which forms a record carrier and can be loaded into an MO deck 82 forming holder means for the disc 81.

A reproduction information signal R reproduced from the magneto-optical disc 81 in the reproduction mode can be applied to output signal processing means 31 via reproduction processing means 47 of the operating means 46. Reproduction information signals R processed in the output processing means 31 can be supplied to the output 32 of the device 2 as digital data. A monitor 83, which includes a loudspeaker, can be connected to the output 32. By means of the monitor 83, the digital data can be displayed optically in the appropriate form or, if applicable, they can be reproduced acoustically by means of the loudspeaker of the monitor.

In the device 2, the identification signal detector detects a start identification signal and a stop identification signal. The identification signal detector 80 supplies activation information AI when the identification signal detector 80 detects a start identification signal. The identification signal detector 80 supplies wait information WI when the identification signal detector 80 detects a stop identification signal. Both the activation information AI and the wait information WI can be applied to the operating means 46 by the identification signal detector 80. In a manner not shown in FIG. 7, the user of the device can adapt both the start identification signal and the stop identification signal to the given case of use and to the expected digital data.

In a case of use, the digital data can be text data containing messages for a plurality of users of a device 2. A start identification signal may then be formed by an identification signal which identifies a user of a device 2 and which, for example, includes the name of the user. In the present case, another nominal start identification signal is defined in the identification signal detector 80 of each device 2. A uniform nominal stop identification signal can be defined for all the devices 2. Digital data transmitted by the data network are received by all the devices 2 connected to the data network. When the user of the device 2 expects digital data with messages destined for the user from the data network, the wait recording mode can be activated by actuation of the recording key 73. In the wait recording mode, a recording information signal W can be stored in a temporary store 50 by consecutive overwriting in a manner corresponding to that illustrated in FIG. 5.

When the identification signal detector 80 detects the given start identification signal in the received digital data, the identification signal detector 80 supplies activation information AI to the operating means 46, as a result of which the continuous recording mode is activated. In the continuous recording mode, a recording information signal W can be stored in the magneto-optical disc 81 in a manner corresponding to that described with reference to FIG. 5. The digital data which follow the given start identification signal and which contain a message for the user of the device 2, are stored in the magneto-optical disc 81 in the continuous recording mode until the identification signal detector 80 detects a stop identification signal. The data storage device formed by the device 2 has the advantage that upon the occurrence of the given start identification signal in the digital data, there is no loss of any part of the message when the recording begins due to the processing times in the identification signal detector 80 and the operating means 46, because the recording information signals W stored in the temporary store 50 are merged with recording information signals W stored in further areas of the magneto-optical disc 81. As a result of this, messages intended for the user of the device 2 are collected on the magneto-optical disc 81 of the device 2 without any part of the messages at the beginning of the message being lost. These messages can be reproduced by the user of the device 2 with the aid of the monitor 83 at an arbitrary later instant by actuation of the reproduction key 76.

It is to be noted that a start identification signal can alternatively be formed by a given sequence of digital data represented as a given graph, a given pattern or a given logo by a computer graphics program. Likewise, a start identification signal can be formed by a given sequence of digital data corresponding to a word of a digitized speech signal. Upon detection of this given sequence of digital data, the continuous recording mode is then activated, without any part of the information signal at the beginning of the recording being lost.

Figure 8:
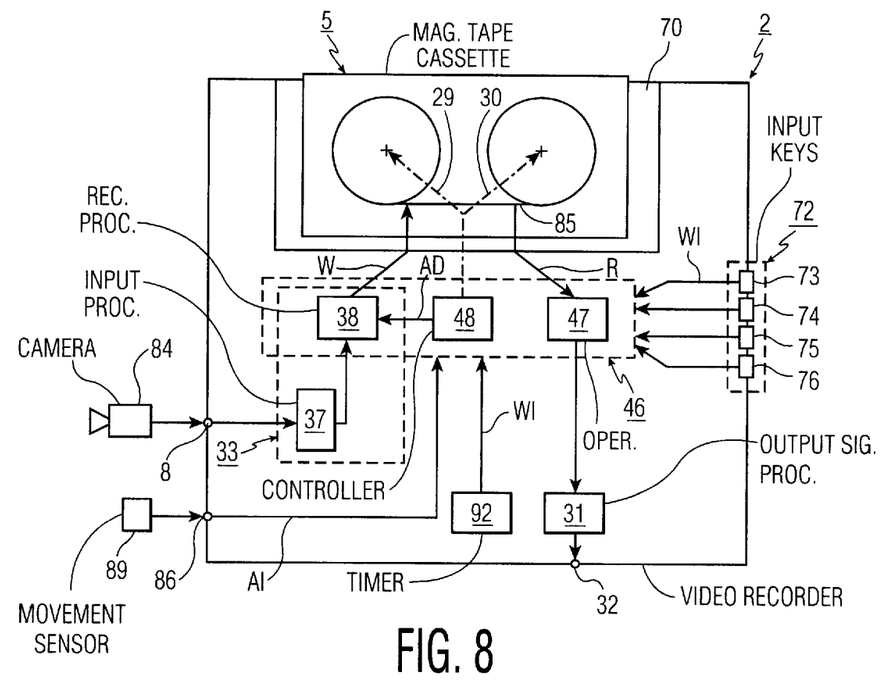
FIG. 8 shows, diagrammatically, a device in accordance with a fourth embodiment of the invention, which is constructed as a magnetic-tape video recorder for the recording of video signals from a supervisory camera during a very long supervision period.
Figure 9:
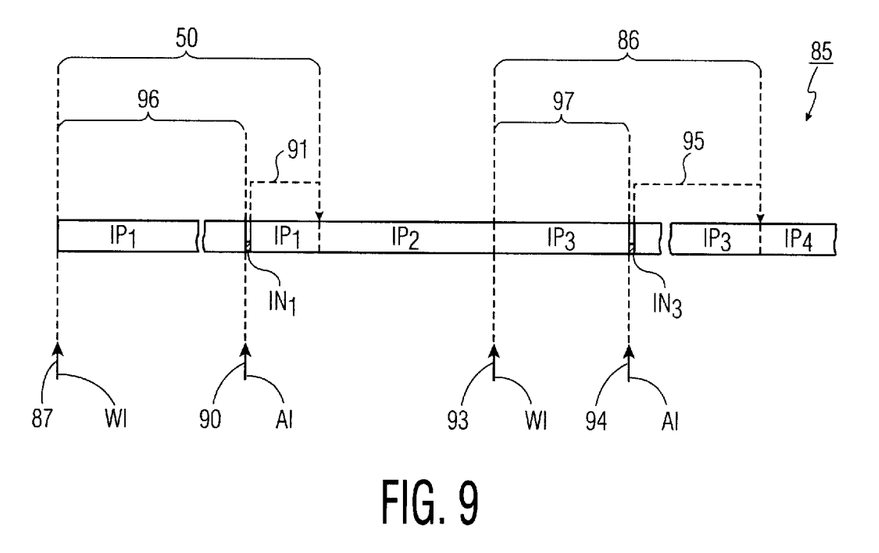
FIG. 9 shows an area of a magnetic tape which forms a record carrier, which magnetic tape is also used as a temporary store in the magnetic-tape video recorder shown in FIG. 8.

FIG. 8 shows, diagrammatically, a device 2 in accordance with a fourth embodiment of the invention, which is constructed as a video recorder for the recording of video signals from a supervisory camera 84 during a very long supervision period. A video signal supplied to the information signal input 8 of the device 2 can be applied to the processing means 33, which include, input processing means 37 and recording processing means 38, the processing means 33 supplying a recording information signal W. The device 2 has holder means 70 constructed to hold a magnetic-tape cassette 5 and from which a previously inserted magnetic-tape cassette 5 can also be removed. The magnetic-tape cassette 5 accommodates a magnetic tape 85 which forms a record carrier. In known manner, recording information signals W can be recorded on the magnetic tape 85, the speed of the magnetic tape being controlled by control means 48 via two operating connections 29 and 30. FIG. 9 shows areas of a magnetic tape 85 in which a recording information signal W is recorded and which form a temporary store 50 and a further temporary store 86.

By actuation of a recording key 73, wait information 87 can be applied to the operating means 46, as a result of which a wait recording mode is activated in the device 2. The operating means 46 records a recording information signal in an information signal packet $IP_1$ in the temporary store 50 by consecutive overwriting in the wait recording mode. The temporary store 50 can then have, for example, a maximum recording time of 5 minutes.

The device 2 shown in FIG. 8 has a detector input 88 connected to the movement sensor 89, which is arranged in the direct vicinity of the supervisory camera 84 and which enables movements within a range of, for example, 5 meters to be detected and, upon detection of a movement, a detection result to be applied to the detector input 88. The detector input 88 is connected to the operating means 46, thus enabling such a detection result to be applied to the operating means 46 as activation information 90. The operating means 46 records address information AD in a successor address packet $IN_1$ when activation information 90 occurs, this address information AD specifying from which position on the magnetic tape 85 a recording information signal W is recorded in an information signal packet $IP_2$ after the occurrence of the activation information 90. This position on the magnetic tape 85, which is specified by the address information in the successor address packet $IN_1$, is marked, symbolically, by a successor pointer link 91.

The device 2 further has a timer 92 which supplies further wait information 93 to the operating means 46 upon expiration of a given time interval after the occurrence of the activation information 90, for example, after 2 minutes. When the further wait information 93 appears, the operating means 46 define an area of the magnetic tape 85 as a further temporary store 86.

In the wait recording mode, in response to an appropriate drive from the movement sensor 89, the operating means 46 can record a recording information signal W in an information signal packet $IP_3$ by consecutive overwriting until further activation information 94 occurs. When the further activation information 94 occurs, address information AD can be recorded in a successor address packet $IN_3$, this address information AD specifying from which position on the magnetic tape 85 the recording information signal W is recorded in an information signal packet $IP_2$ after the occurrence of the further activation information 94. This position from which the recording information signal W is recorded in the information signal packet $IP_4$ is marked by a further successor pointer link 95.

Thus, it is achieved that a video signal supplied by the supervisory camera 84 is initially recorded in the temporary store 50 and, when the movement sensor 89 detects a movement within the detection range of the movement sensor 89, recording is continued in an information signal packet $IP_2$. Furthermore, it is achieved that during reproduction, a merging section 96, in which the video signal from the supervisory camera 84 has been recorded for a period of time before detection of a movement by the movement sensor 89, can be reproduced before the recording information signal W recorded in the information signal packet $IP_2$. Likewise, it is possible, during reproduction, to reproduce a further merging section 97 after the reproduction of the information signal packet $IP_2$ and before the reproduction of the information signal packet $IP_4$. Thus, it is achieved, in a particularly simple manner, that the video signal is also recorded on the magnetic tape 85 before the occurrence of activation information 90 or 94 and the signal quality is not degraded by an additional recording and reproduction process. Moreover, a cheaper video recorder is obtained, in which a separate temporary store has been dispensed with as a result of the use of an area of the record carrier as temporary store.

The reproduction mode can be activated by actuating the reproduction key 76. When the reproduction mode is active, a position from which a reproduction information signal R can be reproduced from the magnetic tape 85 can be defined by means of a position key 75. In this way, it is also possible to reproduce those parts of the information signal packets $IP_1$ and $IP_3$ which are available in the two temporary stores 50 and 86 but not in the two merging sections 96 and 97. As a consequence, if the period of time, which is dictated by the reproduction time of a reproduction information signal R from the two merging sections 96 and 97, is too short for an accurate examination of the video signal from the supervisory camera 84, it can be extended to the total recording time in the two temporary stores 50 and 86. Conversely, if the period of time of the two merging sections 96 and 97 is adequate, it is convenient for the user of the device 2 that the video signal from the supervisory camera 84 can be reproduced both before the occurrence of a detection result from the movement sensor 89 and after the occurrence of a detection result from the movement sensor 89.

It is to be noted that as a result of the provision of a linkage key, as provided in the apparatus shown in FIG. 1, in the device 2 shown in FIG. 8, the period of time can also be reduced subsequently in that the address information AD contained in the successor address packet $IN_1$ is stored in the merging section 96 at a position selected by the position key 75.

What is claimed is:

1. A device for recording an information signal supplied by a signal source in a record carrier, comprising:

processing means for processing an information signal and for supplying a recording information signal;

input means for supplying an activation information and a wait information; and operating means, cooperating with at least a part of the processing means and with the input means, for recording an information signal in the record carrier depending on the occurrence of activation information and for consecutively overwriting storage of a recording information signal in a temporary store at least depending on the occurrence of wait information, wherein:

the operating means arbitrarily assigns an area of the record carrier as the temporary store;

the operating means starts a consecutively overwriting storage of the recording information signal in the temporary store depending on the occurrence of the wait information, and stops the consecutively overwriting storage of the recording information signal in the temporary store depending on the occurrence of the activation information;

and wherein the recording information signal, formed by the processing means and recorded by the operating means, includes information signal packets and address signal packet, the information signal packets corresponding to the information signals, and the address signal packets including address information, whereby, during a reproduction of information signal packets recorded in the temporary store and information signal packets recorded in further areas of the record carrier, the time sequence of the reproduced information signal packets is defined for the purpose of linking the information signal packets.

2. The device as claimed in claim 1, wherein the operating means generates and records at least one item of linkage address information depending on the occurrence of the activation information following the wait information, said at least one item of linkage address information enabling, during reproduction of information signal packets recorded in the record carrier, information signal packets reproduced from the temporary store and further reproduced information signal packets to be linked together in their appropriate time sequence, and enabling the first information signal packet recorded in the record carrier, depending on the occurrence of the activation information, to be linked, during reproduction, after the last information signal packet recorded in the temporary store.

3. The device as claimed in claim 2, wherein the operating means generates and records at least one item of linkage address information, said at least one item of linkage address information enabling, during reproduction, an information signal packet, recorded in the temporary store, to be linked after the information signal packet recorded in the record carrier directly before the occurrence of the wait information.

4. The device as claimed in claim 3, wherein the operating means generates and records at least one item of linkage address information, said at least one item of linkage address information enabling, during reproduction, an information signal packet recorded in the temporary store and arranged as the next information signal packet to be overwritten upon termination of the consecutively overwriting storage in the temporary store, to be linked after the information signal packet recorded in the record carrier directly before the occurrence of the wait information.

5. The device as claimed in claim 3, wherein the operating means generates and records at least one item of linkage address information, said at least one item of linkage address information enabling, during reproduction, an information signal packet recorded in the temporary store and arranged at a given distance before the last information signal packet recorded upon termination of the consecutively overwriting storage in the temporary store, to be linked after the information signal packet recorded in the record carrier directly before the occurrence of the wait information.

6. The device as claimed in claim 2, wherein operating means overwrites address information recorded in the record carrier with linkage address information.

7. The device as claimed in claim 1, wherein the operating means selects, as the temporary store, an area of the record carrier directly adjoining the area of the record carrier in which an information signal packet has been recorded immediately before the occurrence of the wait information.

8. The device as claimed in claim 1, wherein the record carrier comprises a random-access or quasi random access memory.

9. The device as claimed in claim 1, wherein the record carrier is built in the device.

10. The device as claimed in claim 1, wherein the device further comprises a holder means for removably holding the record carrier.

11. The device as claimed in claim 10, wherein the record carrier comprises a solid-state memory accommodated in a protective carrier.

12. The device as claimed in claim 10, wherein the record carrier comprises an optically scanned disc.

13. The device as claimed in claim 10, wherein the record carrier comprises a magnetically scanned disc.

14. The device as claimed in claim 10, wherein the record carrier comprises a magnetic-tape cassette accommodating a magnetic tape.

15. The device as claimed in claim 1, wherein the device comprises a video recorder for recording video signals and audio signals.

16. The device as claimed in claim 1, wherein the device comprises a dictation device for recording speech signals, said dictation device being speech controlled whereby said dictation device is activatable by speech signals to be recorded.

17. The device as claimed in claim 1, wherein the device comprises a data storage device for recording digital data supplied by a signal source.

18. A method of recording an information signal in a record carrier, without loss of part of an information signal at the beginning of a recording, the method comprising the steps:

processing an information signal and supplying a recording information signal;

generating an activation information and a wait information;

recording the recording information signal depending on the occurrence of the activation information; and storing, in a consecutively overwriting fashion, the recording information signal in a temporary store at least depending on the occurrence of the wait information, wherein said method further comprises the steps:

selecting an arbitrarily assignable area of the record carrier as the temporary store;

starting a consecutively overwriting storage of the recording information signal in the temporary store depending on the occurrence of the wait information; and stopping the consecutively overwriting storage of the recording information signal in the temporary store depending on the occurrence of the activation information, and wherein the recording information signal includes information signal packets and address signal packets, the information signal packets corresponding to the information signals, and the address signal packets including address information, whereby, during a reproduction of information signal packets recorded in the temporary store and information signal packets recorded in further areas of the record carrier, the time sequence of the reproduced information signal packets is defined for the purpose of linking the information signal packets.

19. The method as claimed in claim 18, wherein said method further comprises generating and recording at least one item of linkage address information depending on the occurrence of the activation information following the wait information, said at least one item of linkage address information enabling, during reproduction of information signal packets recorded in the record carrier, information signal packets reproduced from the temporary store and further reproduced information signal packets to be linked together in their appropriate time sequence, and enabling also the first information signal packet recorded in the record carrier depending on the occurrence of activation information to be linked, during reproduction, after the last information signal packet recorded in the temporary store.

20. The method as claimed in claim 19, wherein the method further comprises generating and recording at least one item of linkage address information, said at least one item of linkage address information enabling, during reproduction, an information signal packet recorded in the temporary store to be linked after the information signal packet recorded in the record carrier directly before the occurrence of the wait information.

21. The method as claimed in claim 20, wherein the method further comprises generating and recording at least one item of linkage address information, said at least one item of linkage address information enabling, during reproduction, an information signal packet recorded in the temporary store and arranged as the next information signal packet to be overwritten upon termination of the consecutively overwriting storage in the temporary store, to be linked after the information signal packet recorded in the record carrier directly before the occurrence of the wait information.

22. The method as claimed in claim 20, wherein the method further comprises generating and recording at least one item of linkage address information, said at least one item of linkage address information enabling, during reproduction, an information signal packet recorded in the temporary store and arranged at a given distance before the last information signal packet recorded upon termination of the consecutively overwriting storage in the temporary store, to be linked after the information signal packet recorded in the record carrier directly before the occurrence of the wait information.

23. The method as claimed in claim 19, wherein address information recorded in the record carrier is overwritten with linkage address information.

24. The method as claimed in claim 18, wherein the area of the record carrier selected as the temporary store directly adjoins the area of the record carrier in which an information signal packet has been recorded immediately before the occurrence of the wait information.

25. The method as claimed in claim 18, wherein the record carrier comprises a random-access or quasi random access memory for recording the recording information signal.

* * * * *